United States Patent [19]
Buntin et al.

[11] Patent Number: 5,664,885
[45] Date of Patent: Sep. 9, 1997

[54] ELECTRONIC INDUSTRIAL THERMOMETER

[75] Inventors: Roy E. Buntin; Gerald D. Tribble, both of Troy; Bruce J. Jarvie, Oak Park, all of Mich.

[73] Assignee: H.O. Trerice Company, Oak Park, Mich.

[21] Appl. No.: 550,171

[22] Filed: Oct. 30, 1995

[51] Int. Cl.[6] .............................. G01K 7/16; G01K 5/04; G01K 5/08; G01K 5/10; G01K 1/14
[52] U.S. Cl. ........................ 374/183; 374/194; 374/201; 374/190
[58] Field of Search .................................. 374/183, 185, 374/190, 194, 201, 188, 142

[56] References Cited
U.S. PATENT DOCUMENTS

| | | | |
|---|---|---|---|
| 493,558 | 3/1893 | Norton et al. | 374/188 |
| 2,588,882 | 3/1952 | Rolfson | 374/188 |
| 3,487,639 | 1/1970 | Berkowitz | 374/190 |
| 3,503,260 | 3/1970 | Polsky | 374/190 |
| 3,533,289 | 10/1970 | Douglas | 374/188 |
| 3,872,729 | 3/1975 | Ayres | 374/190 |

FOREIGN PATENT DOCUMENTS

| | | | |
|---|---|---|---|
| 2414227 | 10/1974 | Germany | 374/194 |
| 2825353 | 12/1979 | Germany | 374/194 |

*Primary Examiner*—Diego F. F. Gutierrez
*Attorney, Agent, or Firm*—Dykema Gossett PLLC

[57] ABSTRACT

The electronic industrial thermometer combines a conventional industrial thermometer with an electrical resistance temperature detector thus providing a thermometer where the temperature can be read visually at the mounting site and where the detector electronically transfers an electrical signal to a remote site for continuing temperature observation or for recording the temperature on electronic display instrument.

16 Claims, 2 Drawing Sheets

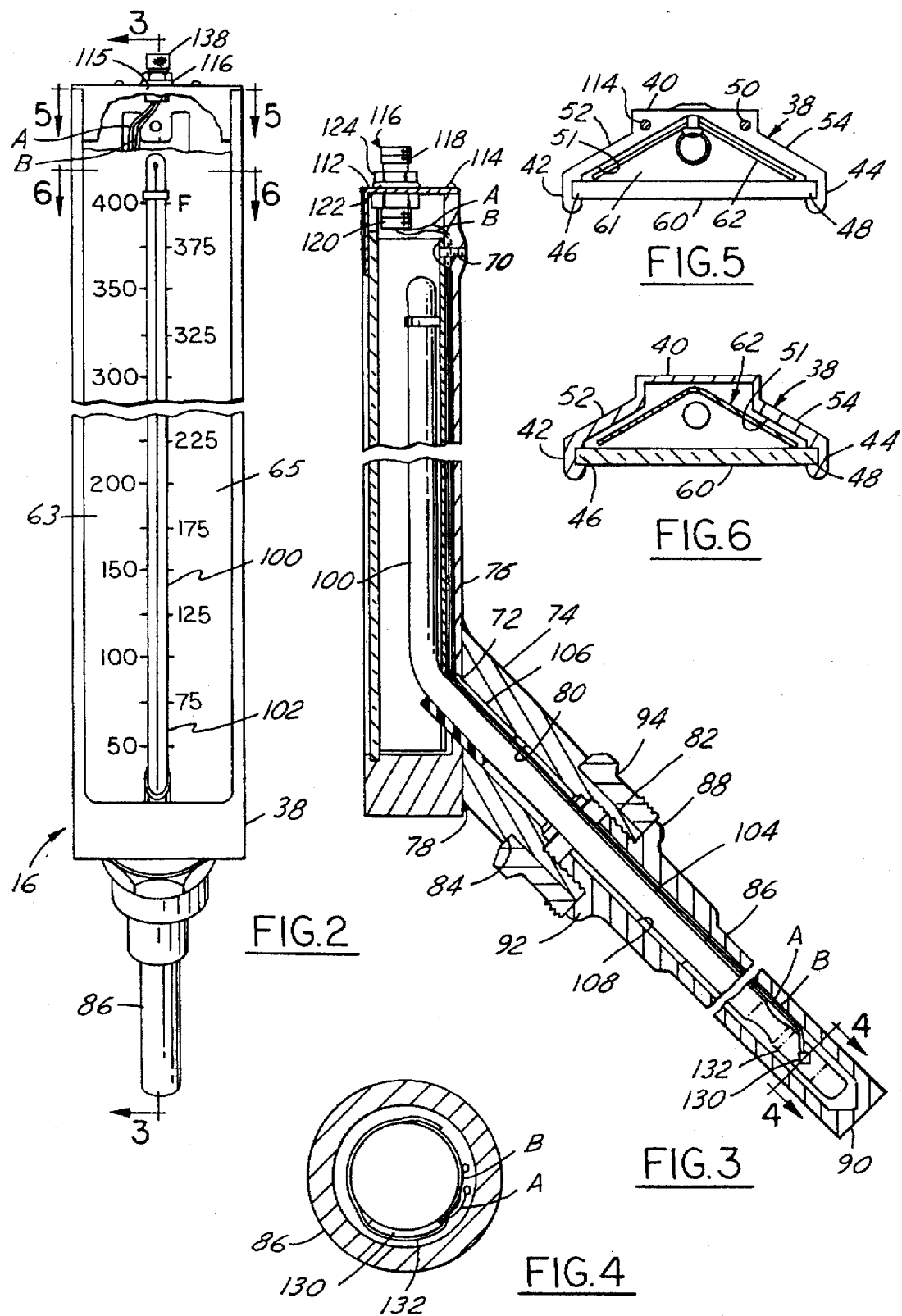

ELECTRONIC INDUSTRIAL THERMOMETER

BACKGROUND OF THE INVENTION

Industrial thermometers are used worldwide by architects, consulting engineers and contractors in connection with various applications requiring the accurate measurement of temperatures within the vessel, retort, furnace, boiler, building construction, process piping, tank, air duct etc. with which the thermometers are used or employed. In such instances, in order to read the temperature, it is necessary to view the industrial thermometer at the site where the industrial thermometer is located. Many electronic sensors exist for measuring temperatures but such sensors are without the backup of reliable industrial thermometers.

SUMMARY OF THE PRESENT INVENTION

It is a feature of the present invention to provide am electronic industrial thermometer which can be visually observed at the site where the thermometer is mounted to note and/or record the temperature and which further employs a resistance temperature detector or a thermocouple sensor which can transfer the temperature electronically to a remote site for continuing observation or for recording on an electronic temperature display instrument. Thus the intrinsic reliability of the industrial thermometer can be a check against the electronic temperature display signal and vice versa.

Another feature of the present invention is that the electronic industrial thermometer may now be observed at any one of a plurality of sites where the temperature can be sent electronically using the same type of industrial thermometer with the built-in electronic option of a resistance temperature detector or an alternate thermocouple sensor to any number of remote areas using digital displays controllers, recorders or other temperature indicating or measuring instruments.

A further feature of the present invention is that the electronic industrial thermometer forms a bridge to connect the time proven, reliable industrial thermometer technology with the latest electronic technology including the use of a built-in resistance temperature detector or alternate thermocouple sensor located in the industrial thermometer.

A still further feature of the present invention is provide an electronic industrial thermometer provided with a resistance temperature detector or thermocouple sensor located within the sensitive portion of the tubular stem of the thermometer. A threaded water proof electrical connection or receptacle is provided at the top of the thermometer casing. This electrical connection or receptacle accepts the electrical wires which are connected to the resistance temperature detector or thermocouple sensor located within the stem of the thermometer. The wires send or direct an electrical signal to one more remotely located digital display instruments such as a temperature recorder or electronic temperature controller. This feature permits temperature monitoring at the point of installation and at one or more remote sites.

Another feature of the present invention is to provide an electronic industrial thermometer comprising an elongated casing having a rear wall with inner and outer surfaces and a pair of parallel side walls having longitudinally extending grooves provided therein. A transparent window forming the front wall of the casing has its longitudinally edges received in the grooves of the side walls.

Still another feature of the present invention is to provide an electronic industrial thermometer which has an elongated plate with a graduated temperature scale thereon mounted within the casing adjacent the inner surface of the rear wall. An opening is provided in the rear wall of the casing adjacent the bottom portion thereof. A hollow stem which is opened at one end and closed at the other end is connected to the casing via the opening. The stem has its interior aligned with the opening. A closed glass tube filled with mercury is mounted in the casing in front of the graduated scale and behind the transparent window to visually indicate to a viewer the temperature upon changes in the level of mercury within the tube.

A further feature of the present invention is to provide electronic industrial thermometer in which the tube has an unexposed portion which extends through the opening into the stem where the tube unexposed portion is spaced from the interior wall of the stem. A resistance temperature detector or thermocouple sensor is secured to the exterior wall of the unexposed portion located within the stem. A plurality of wires are connected to the resistance temperature detector or thermocouple and leads therefrom through the stem and opening into the interior of the casing. An electrical connection or receptacle is carried by the casing and is designed to anchor the ends of the wires for sending via a cable an electrical signal indicating the temperature as shown on the scale to one or more remote sites.

Another feature of the present invention is to provide am electronic industrial thermometer which is rugged in construction, economical to manufacture and which permits the user to have a number of options available to observe the temperature whether at the site where the thermometer is located or at one or more remote sites where the temperature is transmitted to each remote site electronically for display at a digital display, controller or recorder.

BRIEF DESCRIPTION OF THE PATENT DRAWINGS

FIG. 2 is a front elevational view of an electronic industrial thermometer.

FIG. 3 is a sectional view through the electronic industrial thermometer taken on the line 3—3 of FIG. 2.

FIG. 4 is a sectional view through the stem and the resistance temperature detector of the electronic industrial thermometer taken on the line 4—4 of FIG. 3.

FIG. 5 is a sectional view taken on the line 5—5 of FIG. 2.

FIG. 6 is a sectional view taken on the line 6—6 of FIG. 2.

DESCRIPTION OF THE PREFERRED EMBODIMENT

Figure 1:
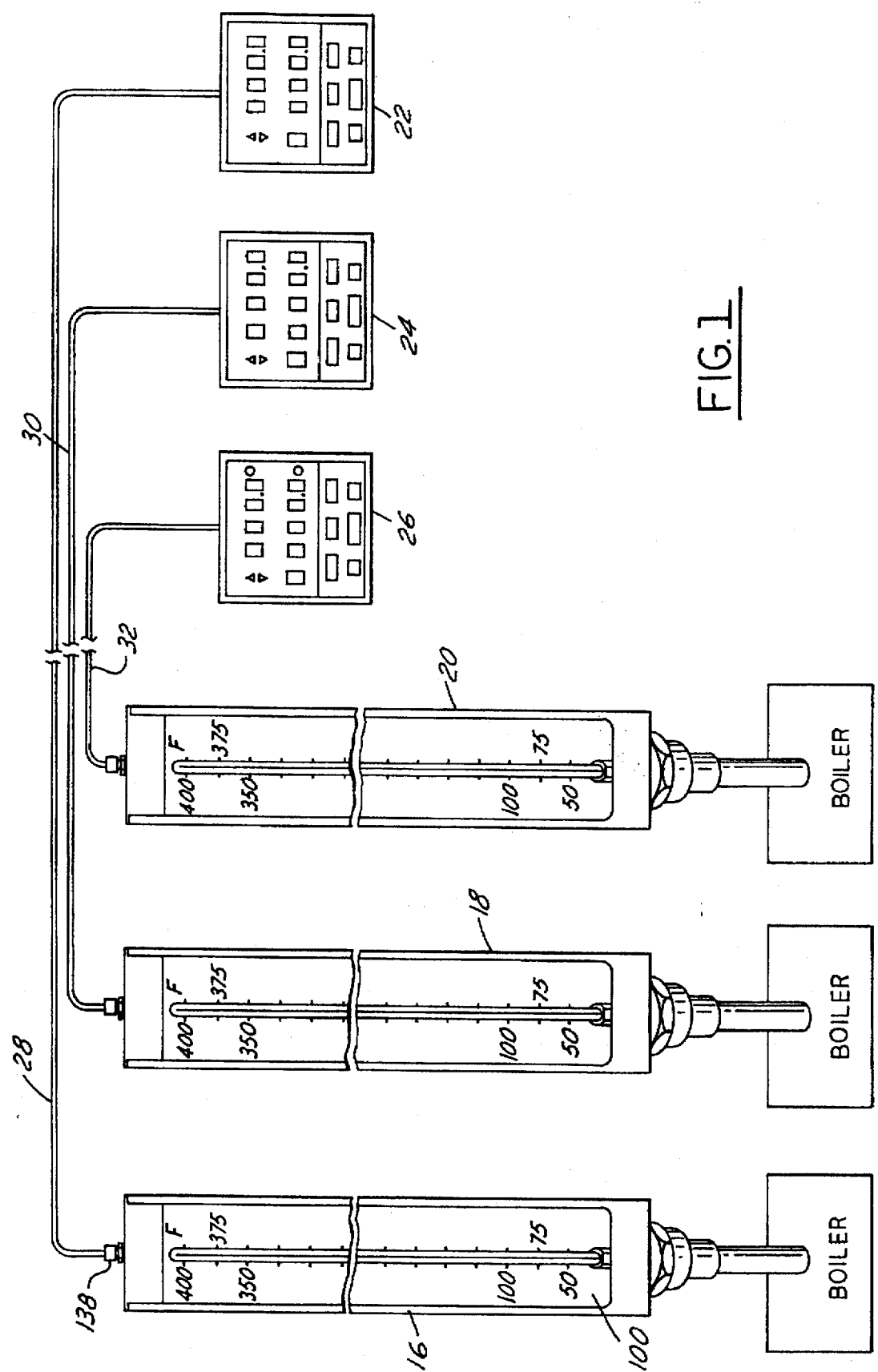
FIG. 1 is a front elevational view illustrating a typical application where the electronic industrial thermometers are mounted on boilers in order to observe the temperatures at the site where the industrial thermometers are mounted but also to electronically send signals indicating the temperatures to digital display instruments which are located at remote sites.

Referring now to FIG. 1, there is shown diagrammatically a series of boilers 10, 12 and 14, each having mounted therein an electronic industrial thermometer 16, 18 and 20 respectively. The temperature of each boiler may be measured at the site where the thermometer is mounted by visually observing the mercury in the tube of the thermometer as is conventional with industrial thermometers. The present invention also permits the temperatures at the boilers to be observed at the remote temperature display units 22, 24 and 26. The electronic industrial thermometer 16 is connected to the electrical temperature display unit 22 by the cable 28; the electronic industrial thermometer 18 is connected to the temperature display unit 24 by electrical cable 30 while the electronic industrial thermometer 26 is connected to the temperature display unit 26 by the electrical cable 32. The temperature display units 22, 24 and 26 may be located apart together in a control room or in a room under controlled conditions whereby an operator can observe and record the temperatures in the boilers 10, 12 and 14. The temperature display units may be located adjacent to or spaced from the industrial thermometers 16, 18 and 20, an example, 16 feet or more. One temperature display unit which may used is the TREEICE auto-tuning PID controller, a microprocessor-based system, Series TR824, sold by the H. O. Trerice Co.

The electronic industrial thermometer 16 (FIG. 2) has metal casing 38, made, as an example from die cast aluminum. The case 38 includes a back wall 40, and a pair of elongated parallel side walls 42 and 44 having laterally spaced apart longitudinally extending grooves 46 and 48 respectively. The grooves 46, 48 extend from the top of the casing 38 to near the bottom thereof as shown in FIG. 3. The rear wall 40 of casing 38 includes a center portion 50 and a pair of laterally and forwardly extending side wall portions 52 and 54 as best illustrated FIGS. 5 and 6. The inner surface 51 of rear wall 40 forms a "V" as shown in FIGS. 5 and 6. The casing 38 has an elongated transparent window 60 extending from the top of the casing 38 towards the bottom. The transparent window 60 forms the front wall of the casing 38 and has the longitudinal edges thereof received in the longitudinal grooves 46 and 48 of the side walls 42 and 44 respectively as shown in FIGS. 5 and 6. The transparent window or front wall 60 is spaced from the rear wall 40 to generally enclose the interior space 61 of the industrial thermometer 16. The window 60 is made from a clear acrylic plastic material.

A elongated plate 62 of V-shaped configuration as shown in FIGS. 5 and 6 is mounted in the interior space 61 adjacent the inner surface 51 of the rear wall 40. The plate 62 on the front side thereof is provided with a graduated temperature scale 63 on one side of the plate 62 and a graduated pressure scale 65 on the opposite side of the plate as shown in FIG. 2. The thermometer measures temperatures up to 270° Fahrenheit or more depending on the instrument. Some instruments can measure temperatures in various ranges up to 450°. The plate 62 is held in place in casing 38 by the screw 70. The plate 62 is spaced from the inner surface 51 of the rear wall 40 to permit the electrical wires from the resistance temperature detector to be located therebetween as will be subsequently described.

The rear wall 40 at the lower portion of the casing 38 is provided with an opening 72. A tubular guide member 74 has one end thereof abutting the rear surface 76 of the back wall 40. Tubular guide member 74 is secured to the rear wall 40 by welds 78. The tubular guide member 74 has a passage 80 therein which extends from one end to the other. The outer end of passage 80 remote from the back wall 40 is internally threaded at 82. The tubular guide member 74 has an annular abutment or abutment surface 84 intermediate the ends thereof.

A hollow stem 86 made, as an example, from aluminum, brass or stainless steel is opened at one end 88 and closed at the other end 90. End 88 is reduced in diameter and is externally threaded. Inwardly set from threaded end 88 is an annular flange 92. A nut is placed on the tubular guide member 74 which is held against axial movement thereon by the provision of the flange 92 and the annular abutment 94 after the end 88 is threaded into the internally threaded portion 82 of guide member 74. The nut 94 is externally threaded which will permit the thermometer to be mounted, as an example, on a boiler 10 with the stem 86 extending into the well of the boiler in order to provide metal to metal contact and maximum sensitivity as is well known in the art.

A closed glass tube 100 is mounted in the casing 38. The tube is filled with distilled mercury. An inert gas is used above the mercury column to prevent oxidation of the mercury. The tube 100 has a vertical or exposed portion 102 and an unexposed and bent portion 104. The exposed portion 102 is mounted within the casing 38 in front of the scaled plate 62 in order to show the change in temperature. The unexposed portion 104 of tube 100 is provided with a resilient bushing 106 made, as an example, from a silicone compound and which extends through the opening 72 and is designed to locate the unexposed portion 104 of the tube in the stem 86. The unexposed portion 104 of the tube is spaced from the interior side wall 108 of the stem 86.

The stem 86 is provided with a heat transfer material which surrounds the glass tube 100. The heat transfer material may be either graphite or mercury. A seal of high temperature RTV is added in the end of the stem flange 92 to prevent the loss of the graphite or mercury through the gap left by the passage of the wires A and B through the resilient bushing 106.

The industrial thermometer 16 further includes a top plate 112 which is secured to the top of the casing by a pair of screws 114. The top plate 112 is designed to overlie the top surfaces of the rear wall 40, side walls 42, 44, the transparent window 60 and the interior space 61. The top closing plate 112 is removable. A centrally located opening 115 is provided in the plate 112 for the reception of an electrical connector or receptacle 116. The receptacle 116 has an externally threaded outer portion 118 and an externally threaded inner portion 120. Sleeved over the external threaded portion 118 is a resilient seal or O-ring seal 122 and a threaded nut 124. An internally threaded nut 126 is located on the inside surface of the top plate 112. The electrical receptacle 116 just described is a 3-pole receptacle made by Crouse-Hinds Molded Products and referred to as its Nanoline Receptacle No. 5000125-1.

The electrical 3-pole receptacle 116 has mounted therein the ends of two wires A and B which lead from the 3-pole receptacle 116 along the backside of the graduated plate 62 in the narrow space provided between the plate 62 and the inner surface 51 of the rear wall. The wires A and B continue through the opening 72 into the tubular stem 86 of the thermometer. The wires A and B terminate in a resistance temperature detector (RTD) or thermocouple sensor 130. The wires A and B and part of the detector 130 are secured to the unexposed portion 104 of the tube 100 by means of a Polyimide tape 132 called KAPTON® and sold by DuPont. The tape binds and secures the wires A and B and detector 130 in place. Polyimide tape 132 such as the brand as K-250 Kapton® is used since it can withstand high temperatures. Several layers of the tape 132 are wound around the wires A and B and the detector 130 to secure same to the glass tube portion 104. The tape securely fastens the wires and RTD element to the glass tube. The wires A and B are coated with Teflon®. The detector 130 which is suitable for this application is RTD sensing element sold by George Instrument Inc. (RTD-BI-xx-xx-xx-100-PLT-1-36-2-A-A Special Wafer RTD). This sensing element is a precision platinum type RTD with a 3-wire lead wire circuit. It has a temperature coefficient of resistance or a TCR curve be. 00385 ohms/ohms/°C. with a class A tolerance (±0.06% at 0°C.).

The third pole on the RTD connector 116 on the top of he instrument contains a small "jumper" connection between two of the poles. The third wire is for ambient temperature corrections across long runs of wire, such as 100 feet. It is believed that the ambient temperature errors across 6 to 12 inches is negligible. When the alternate thermocouple sensor is used in place of the RTD only two (2) wires are required throughout the instrument.

When the electronic industrial thermometer 16 is mounted to indicate temperature, a person can visibly read the scale shown on the thermometer by viewing it through the transparent window 60. At the same time, the resistance temperature detector 130 transmit via the wires A, B and C terminating in the 3-pole receptacle 116 an electrical signal which is transmitted to a remote site 22, as shown in FIG. 1, by a cable 28. The cable 28 has on one end a 3-pole 90° 3 coupler plug 138 made by Grouse-Hinds Molded Products and referred to as its Nano-line Connector or Plug Number 5000125-11 w/o LEDS 90°. This connector or plug 138 permits the cable 28 to transmit the electrical signal to the remote site represented by the electronic temperature display 22 in FIG. 1.

The present invention may be incorporated in the standard "BX" series industrial thermometers of H. O. Trerice Co. Such thermometers may have a bottom outlet, a back outlet (90°) or an adjustable angle outlet as described in Catalog No. 110 of H. O. Trerice Go. bearing a 1964 copyright notice. The drawing (FIG. 3) shows the stem 86 at an oblique angle of 135° with respect to the rear surface 76 of the back wall 40 although the RTD may be applied to any angle industrial thermometer as indicated.

It should be appreciated that the identification herein of several products or components by their trademarks are for reference only and do not limit the use of other components available under different trademarks.

What we claim is:

1. An electronic industrial thermometer comprising an elongated casing having a rear wall with inner and outer surfaces, a pair of parallel side walls, said side walls having longitudinally extending grooves provided therein, an elongated transparent window forming the front wall of said casing and having the longitudinal edges thereof received in said grooves, said transparent window being spaced from the inner surface of said rear wall, an elongated plate with a graduated temperature scale thereon mounted within said casing adjacent the inner surface of said rear wall, an opening provided in the rear wall of said casing adjacent the bottom portion thereof, a tubular guide member with a bore therein secured on one end to the outer surface of said rear wall, said bore being aligned with said opening, said bore at the other end of said guide member being internally threaded, a hollow stem which is open at one end and closed at the other end being threadedly connected on the open end thereof to the threaded end of said guide member, said stem having the interior thereof aligned with said bore and said opening, a closed glass tube filled with mercury mounted in said casing in front of said graduated scale to visually indicate to a viewer the temperature upon changes in the level of mercury within said tube, said tube having an unexposed portion extending through said opening and said bore into said stem where said tube portion is spaced from the interior wall of said stem, a resistance temperature detector secured to the exterior wall of said tube portion located within said stem, a plurality of wires connected to said resistance temperature detector and leading therefrom through said stem and said bore and along the backside of said plate adjacent the inner surface of said rear wall, and an electrical receptacle carried by said casing and anchoring the ends of said wires for sending an electrical signal indicating the temperature as shown on said scale to a remote site.

2. The electronic industrial thermometer of claim 1 wherein a top closing plate is secured to the upper end of said casing overlying said rear wall, side walls and transparent window, said top closing plate having an opening receiving said electrical receptacle for anchoring the ends of said wires.

3. The electronic industrial thermometer of claim 2 wherein said electrical receptacle is a three pole receptacle which is adapted to be attached by an electrical cable to an electrical temperature display instrument.

4. The electronic industrial thermometer of claim 2 wherein said electrical receptacle extends through the opening provided in said top closing plate, said receptacle being provided with an annular seal which surrounds said opening, said receptacle being threaded to include a first portion which extends into said casing and a second portion which extends beyond said top closing plate, said threaded portions carrying threaded nuts on opposite sides of said top closing plate to secure said electrical receptacle to said top closing plate.

5. The electronic industrial thermometer of claim 1 wherein a polyimide tape is used to hold said detector and wires against the glass tube portion located within said stem.

6. The electronic industrial thermometer of claim 1 wherein a top plate overlies and is secured to the top of said casing, said receptacle is a 3-pole receptacle and is provided on said top plate for receiving the ends of the wires provided within the casing, said receptacle having an externally threaded stem portion which permits the thermometer to be attached by a 3-pole 90° coupler plug with cable to an electrical temperature display instrument.

7. The electronic industrial thermometer of claim 1 wherein an externally threaded mounting nut is located on said tubular guide member for rotation, said nut being held against axial movement by a flange portion provided on said stem and an abutment surface provided on said tubular guide member, said nut permitting the thermometer to be mounted in a vessel whose temperature is to be measured.

8. The electronic industrial thermometer of claim 1 wherein a resilient bushing surrounds said tube portion at the place where said tube portion enters the opening in said casing and the bore of said guide member to assist in holding the tube in place.

9. The electronic industrial thermometer of claim 1 wherein said tubular guide member is welded to the back surface of said rear wall.

10. An electronic industrial thermometer comprising a casing having a rear wall with inner and outer surfaces, a pair of parallel side walls, said side walls having grooves provided therein, a transparent window forming the front wall of said casing and having the edges thereof received in said grooves, said transparent window being spaced from the inner surface of said rear wall, a plate with a graduated temperature scale thereon mounted within said casing adjacent the inner surface of said rear wall, an opening provided in said casing adjacent the bottom portion thereof, a hollow stem which is open at one end and closed at the other end being connected on the open end thereof to said casing, said stem having the interior thereof aligned with the interior of said casing through said opening, a closed glass tube filled with mercury mounted in said casing in front of said graduated scale to visually indicate to a viewer the temperature upon changes in the level of mercury within said tube, said tube having an unexposed portion extending through said opening into said stem where said tube portion is spaced from the interior wall of said stem, a resistance temperature detector secured to the exterior wall of said tube portion located within said stem, a plurality of wires connected to said resistance temperature detector and leading therefrom through said stem and along the backside of said plate adjacent the inner surface of said rear wall, and an electrical receptacle carried by said casing and anchoring the ends of said wires for sending an electrical signal indicating the temperature as shown on said scale to a remote site.

11. The electronic industrial thermometer of claim 10 wherein a top closing plate is secured to the upper end of said casing overlying said rear wall, side walls and transparent window, said top closing plate having an opening receiving said electrical receptacle for anchoring the ends of said wires.

12. The electronic industrial thermometer of claim 11 wherein said electrical receptacle is a three pole receptacle which is adapted to be attached by an electrical cable to an electrical temperature display instrument.

13. The electronic industrial thermometer of claim 11 wherein said electrical receptacle extends through the opening provided in said top closing plate, said receptacle being provided with an annular seal which surrounds said opening, said receptacle being threaded to induce a first portion which extends into said casing and a second portion which extends beyond said top closing plate, said threaded portions carrying threaded nuts on opposite sides of said top closing plate to secure said electrical receptacle to said top closing plate.

14. The electronic industrial thermometer of claim 10 wherein a polyimide tape is used to hold said detector and wires against the glass tube portion located within said stem.

15. The electronic industrial thermometer of claim 10 wherein a top plate overlies and is secured to the top of said casing, said receptacle is a 3-pole receptacle and is provided on said top plate for receiving the ends of the wires provided within the casing, said receptacle having an externally threaded stem portion which permits the thermometer to be attached by a 3-pole 90° coupler plug with cable to an electrical temperature display instrument.

16. The electronic industrial thermometer of claim 10 wherein a resilient bushing surrounds said tube portion at the place where said tube portion enters the opening in said casing and the stem to assist in holding the tube in place.

* * * * *